US012097477B1

(12) United States Patent
Lu

(10) Patent No.: US 12,097,477 B1
(45) Date of Patent: Sep. 24, 2024

(54) AUTOMATIC COMPOUNDING MACHINE FOR FOOD AND MEDICINE PREPARATION

(71) Applicant: Auson Pharmaceuticals, Inc., Bridgewater, NJ (US)

(72) Inventor: Enxian Lu, East Brunswick, NJ (US)

(73) Assignee: AUSON PHARMACEUTICALS INC., Bridgewater, NJ (US)

( * ) Notice: Subject to any disclaimer, the term of this patent is extended or adjusted under 35 U.S.C. 154(b) by 0 days.

(21) Appl. No.: 18/497,548

(22) Filed: Oct. 30, 2023

Related U.S. Application Data

(63) Continuation of application No. PCT/CN2023/087174, filed on Apr. 8, 2023.

(30) Foreign Application Priority Data

Mar. 6, 2023 (CN) ........................ 202310208540.8

(51) Int. Cl.

| | |
|---|---|
| ***A47J 31/40*** | (2006.01) |
| ***B01F 23/50*** | (2022.01) |
| ***B01F 35/71*** | (2022.01) |
| *B01F 101/06* | (2022.01) |
| *B01F 101/22* | (2022.01) |

(52) U.S. Cl.
CPC ............ *B01F 35/716* (2022.01); *B01F 23/56* (2022.01); *B01F 35/712* (2022.01); *B01F 35/717611* (2022.01); *B01F 35/7177* (2022.01); *B01F 2101/06* (2022.01); *B01F 2101/22* (2022.01)

(58) Field of Classification Search
CPC .......... A47J 31/40; A47J 31/401; A47J 31/36; A47J 31/404; A47J 31/46; A47J 31/468; A61J 3/00; B01F 23/56; B01F 35/716; B01F 35/7177; B01F 35/717611; B01F 35/712
USPC .... 222/129.4, 135, 145.5, 145.6, 146.5, 575
See application file for complete search history.

(56) References Cited

U.S. PATENT DOCUMENTS 8,360,279 B1 * 1/2013 Giles .................... B01F 33/846 222/145.6
11,590,468 B1 * 2/2023 Papp ................. G01N 35/1002
2005/0236431 A1 * 10/2005 Rahn .................... A47J 31/468 222/146.2
2011/0163127 A1 * 7/2011 Dibella-Lenaway ........................ A47J 31/401 222/145.6

(Continued)

*Primary Examiner* — Charles P. Cheyney
(74) *Attorney, Agent, or Firm* — FOX ROTHSCHILD LLP

(57) ABSTRACT

The present invention presents an automatic compounding machine for food and medicine and relates to the technical field of food and medicine preparation. An automatic compounding machine for food and medicine, including a hatch, the hatch is provided with an automatic powder dropping module for feeding special powder, an automatic water filling module for feeding water, and a bottle holder for supporting a mixing bottle; the bottle holder is provided with a first drive motor, and the drive shaft of the first drive motor is provided with a first mounting plate, and the first mounting plate is provided with two magnetic blocks at intervals. The present invention can be used for mixing and stirring the contents of solid food, tablets or capsules with special powders and pure water into a liquid suspension, thus facilitating the taking of solid food or drugs, and the accurate dosing division of drugs, saving time and effort with high preparation efficiency.

10 Claims, 15 Drawing Sheets

(56) References Cited

U.S. PATENT DOCUMENTS

| | | | | |
|---|---|---|---|---|
| 2012/0170402 | A1* | 7/2012 | Schauerte | B01F 25/85 366/162.1 |
| 2013/0032611 | A1* | 2/2013 | Dooley | A47J 31/401 222/145.5 |
| 2013/0032612 | A1* | 2/2013 | Armstrong | A47J 31/401 222/145.5 |
| 2013/0200101 | A1* | 8/2013 | Dooley | B65D 88/68 222/129.4 |
| 2014/0153354 | A1* | 6/2014 | Palmers | B28C 7/0413 366/8 |
| 2016/0280454 | A1* | 9/2016 | Mills | B65D 25/28 |
| 2023/0390485 | A1* | 12/2023 | Ovadia | A61M 5/14228 |

* cited by examiner

AUTOMATIC COMPOUNDING MACHINE FOR FOOD AND MEDICINE PREPARATION

FIELD OF THE INVENTION

The present invention relates to the field of the invention of food and medicine preparation, specifically to an automatic compounding machine for food and medicine.

BACKGROUND OF THE INVENTION

As many existing drugs need dose division when in use, tablets or capsules in the traditional compounding encounter problems such as manual grinding, inaccurate dose, and dose loss. In addition, populations with swallowing difficulties, such as children, the elderly and critically ill patients, are unable to swallow solid food or drugs. Therefore, converting the solid food, tablets or capsules into a liquid suspension may facilitate the taking of solid food or drugs, and also the accurate dosing division of drugs. However, converting solid food and drugs to liquid suspensions by manual operation is inefficient and time-consuming.

SUMMARY OF THE INVENTION

The present invention aims at providing an automatic compounding machine for food and medicine preparation by converting solid food, tablets or capsules into a liquid suspension, thus facilitating the taking of solid food or drugs, and the accurate dosing division of drugs, saving time and effort with high preparation efficiency.

Embodiments of the present invention are as follows:

Embodiments of the present application provide an automatic compounding machine for food and medicine preparation, including a hatch provided with an automatic powder dropping module for feeding special powder, an automatic water filling module for feeding water, and a bottle holder for supporting mixing bottles; the bottle holder is provided with a first drive motor, and the drive shaft of the first drive motor is provided with a first mounting plate, and the first mounting plate is provided with two magnetic blocks at intervals.

Further, in some embodiments of the present invention, the hatch is rotated with a driving sleeve, and the outer side wall of the driving sleeve is provided with an arc-shaped rack; the bottom of the bottle holder is rotated in the driving sleeve, and the outer side wall of the bottle holder is provided with a limit slider; the inner side wall of the driving sleeve is tilted upward with a limit chute, and the limit slider is provided sliding in the limit chute; the hatch is provided with a second drive motor, the second drive motor is connected with a second gear, and the second gear engages with the rack.

Further, in some embodiments of the present invention, the hatch is provided with a limit seat, the limit seat is provided with a limit hole, the limit seat is located in the limit hole with a guide block; the bottle holder slides through the limit hole, the outer side wall of the bottle holder is provided with a guide groove along its axial direction, the guide block is provided sliding in the guide groove.

Further, in some embodiments of the present invention, the automatic powder dropping module includes a stock roll rotating in the hatch, the side wall of the stock roll is provided with a plurality of stock chests along its circumferential direction, the stock roll is provided with a first gear aligned coaxially; the hatch is provided with a third drive motor, the third drive motor is connected with a third gear, and the third gear engages with the first gear.

Further, in some embodiments of the present invention, the hatch is provided with a guide funnel, the stock roll is located at the top opening of the guide funnel, and the bottom opening of the guide funnel is located above the bottle holder.

Further, in some embodiments of the present invention, the hatch is rotated with a protecting hood for shielding the stock roll.

Further, in some embodiments of the present invention, the automatic water filling module includes a water tank, a peristaltic pump, a guide tube and a discharging tube arranged in the hatch, the discharging tube is connected to the outlet end of the peristaltic pump through a pipe, and the outlet port of the discharging tube is located above the bottle holder; the guide tube is connected to the inlet end of the peristaltic pump through a pipe, the bottom of the water tank is provided with an outlet hole, and the outlet hole is connected to the guide tube.

Further, in some embodiments of the present invention, the water tank is removably connected to the hatch, the bottom of the water tank is provided with a casing along the outlet hole, and the inner diameter of the casing is larger than the diameter of the outlet hole; a mounting block is provided sliding in the casing, the diameter of the mounting block is smaller than the inner diameter of the casing, the mounting block is provided with a sealing plate for sealing the outlet hole, the diameter of the sealing plate is larger than that of the outlet hole, and the sealing plate is located in the water tank;

The bottom of the mounting block is located outside the casing, the casing is provided with a spring inside, the spring sheaths outside the mounting block with one end connected to the water tank and the other end to the bottom of the mounting block; the guide tube is provided with a bottom plate, the bottom plate is provided with a plurality of through holes, and the bottom of the mounting block touches the bottom plate.

Further, in some embodiments of the present invention, the hatch is provided with a clamping plate, and the side wall of the water tank is provided with a clamping slot that fits with the clamping plate.

Compared to the prior art, embodiments of the present invention have at least the following advantages or beneficial effects:

Embodiments of the present invention provide an automatic compounding machine for food and medicine, including a hatch, the hatch is provided with an automatic powder dropping module for feeding special powder, an automatic water filling module for feeding water, and a bottle holder for supporting a mixing bottle; the bottle holder is provided with a first drive motor, and the drive shaft of the first drive motor is provided with a first mounting plate, and the first mounting plate is provided with two magnetic blocks at intervals.

It is used for mixing and stirring the contents of solid food, tablets or capsules with special powders and pure water into a liquid suspension, thus facilitating the taking of solid food or drugs, and the accurate dosing division of drugs, saving time and effort with high preparation efficiency.

BRIEF DESCRIPTION OF THE DRAWINGS

In order to more clearly illustrate the technical solutions of the embodiments of the present invention, the following drawings are briefly described for use in the embodiments. It should be understood that the following accompanying drawings illustrate only some embodiments of the present invention and therefore should not be regarded as limiting the scope. For those of ordinary skill in the art, other related drawings may be obtained from these accompanying drawings without creative effort.

Figure 1:
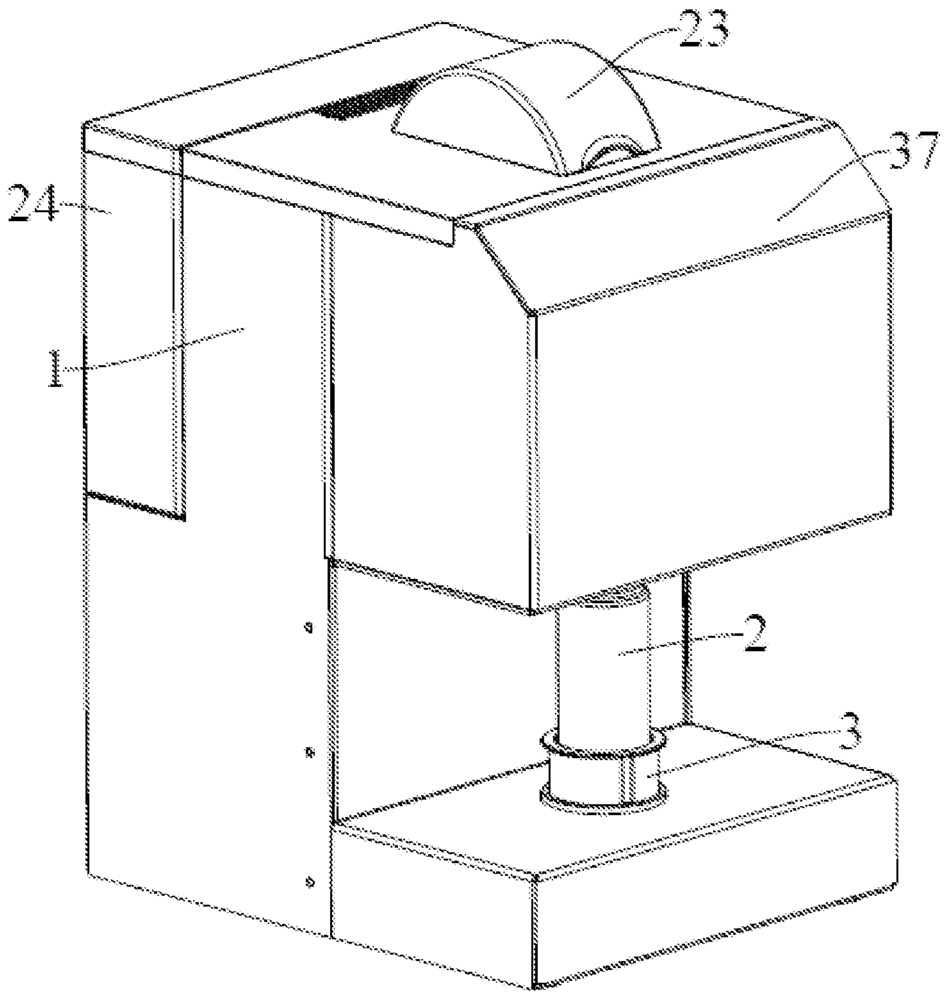
FIG. 1 shows a structural diagram of the automatic compounding machine for food and medicine provided in the embodiments of the present invention.
Figure 2:
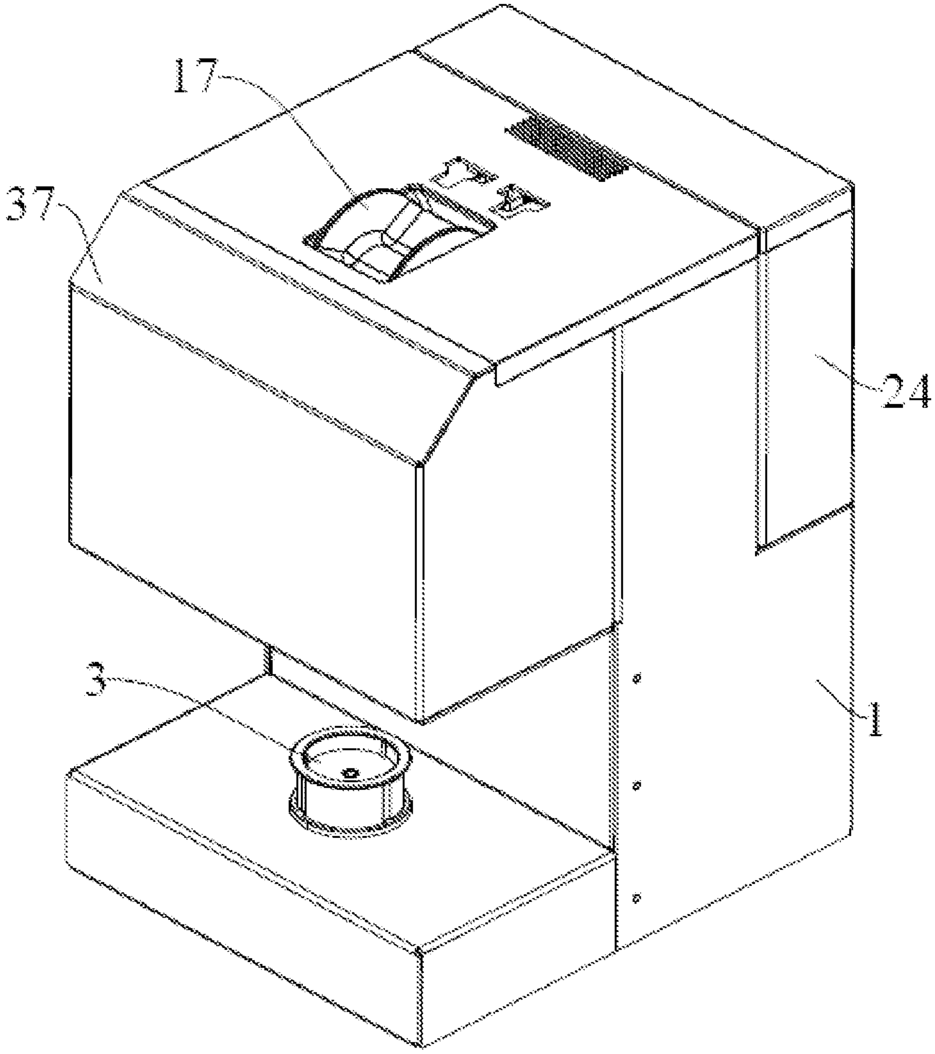
FIG. 2 shows a structural diagram in FIG. 1 with the mixing bottle and protecting hood removed.
Figure 3:
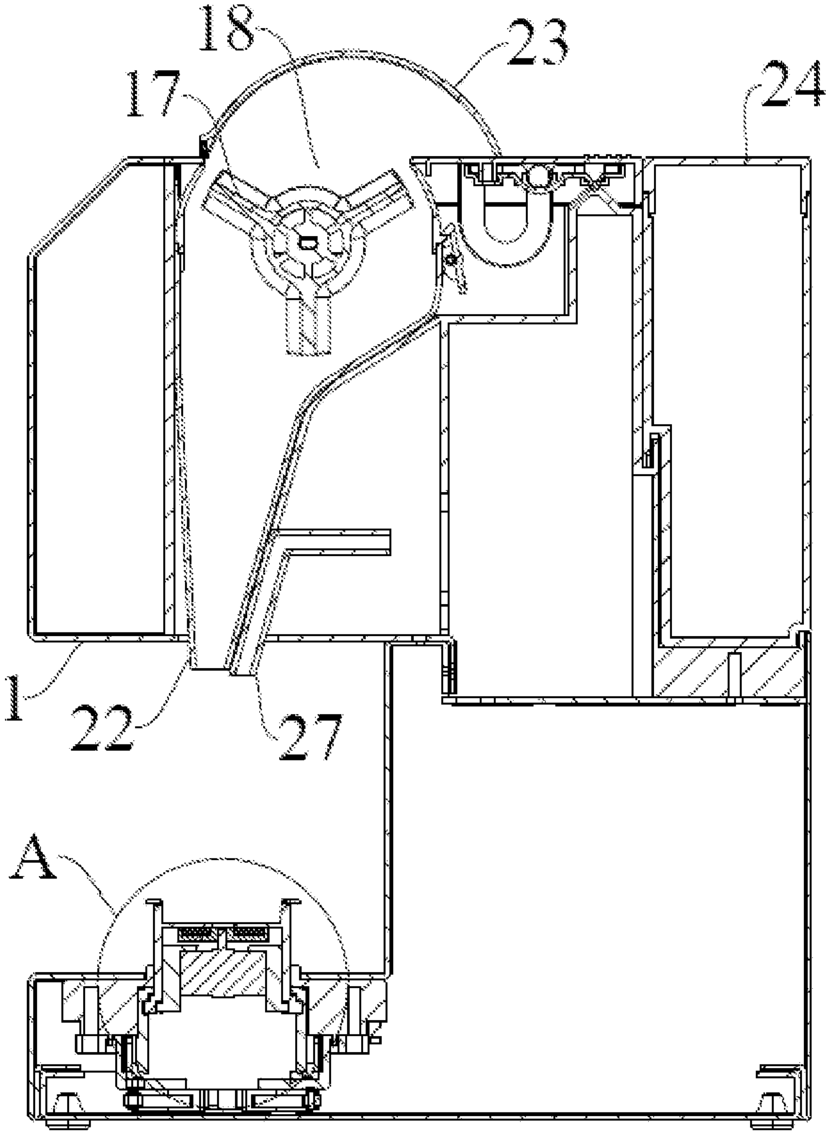
FIG. 3 shows a partial cross-sectional view of the automatic compounding machine for food and medicine provided in the embodiments of the present invention.
Figure 4:
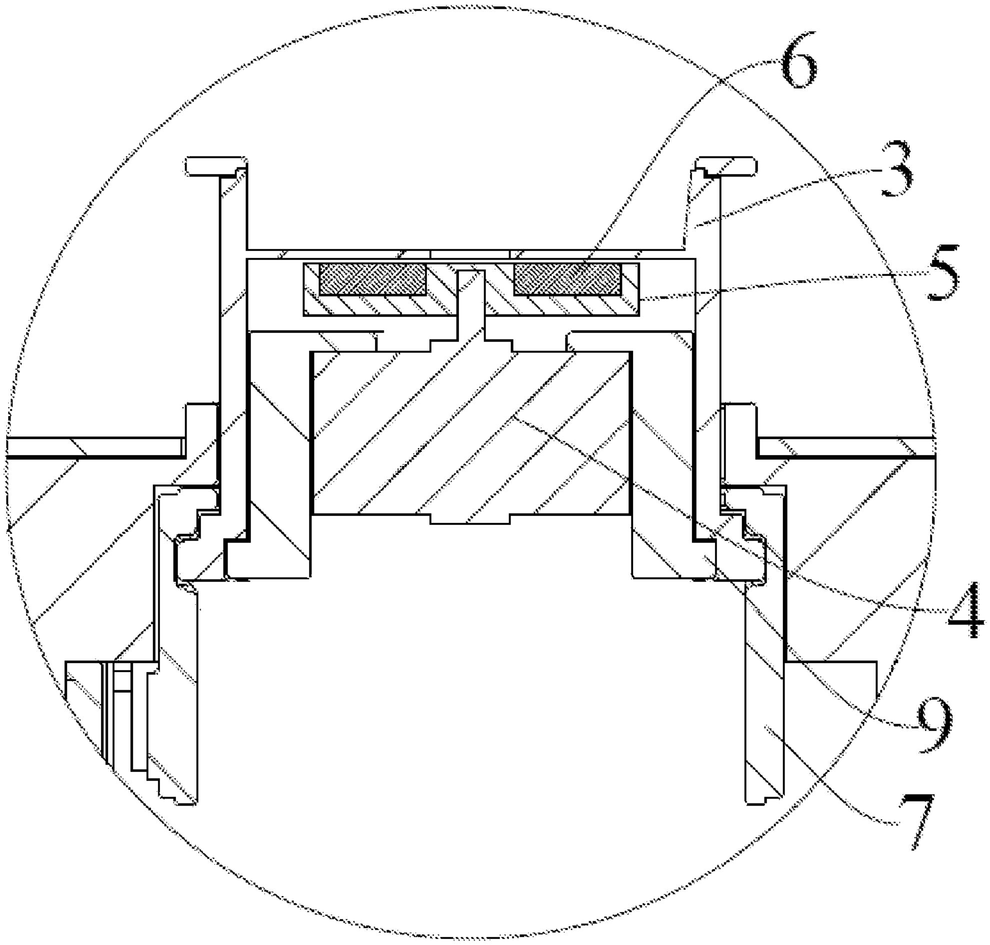
FIG. 4 shows an enlarged view of part A in FIG. 3.
Figure 5:
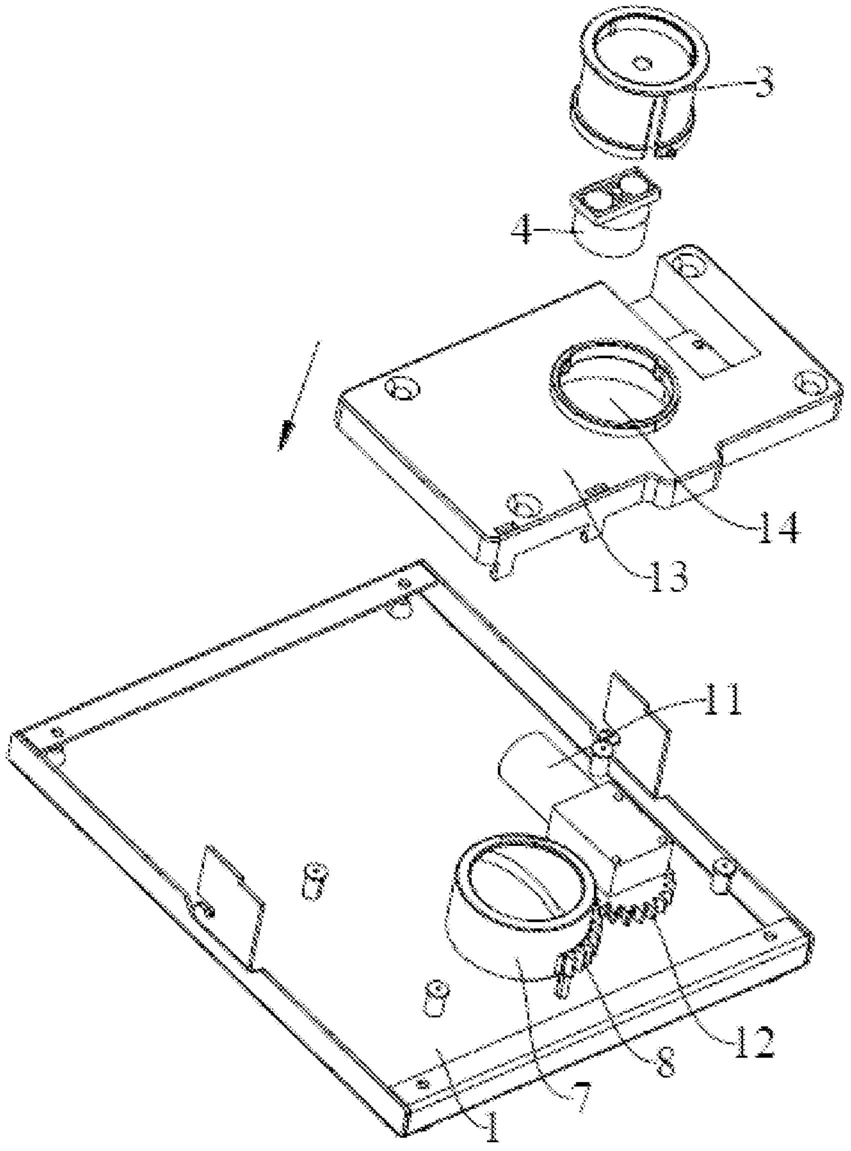
FIG. 5 shows an explosive view of the bottle holder, the first drive motor, the limit seat and the driving sleeve provided in the embodiments of the present invention.
Figure 6:
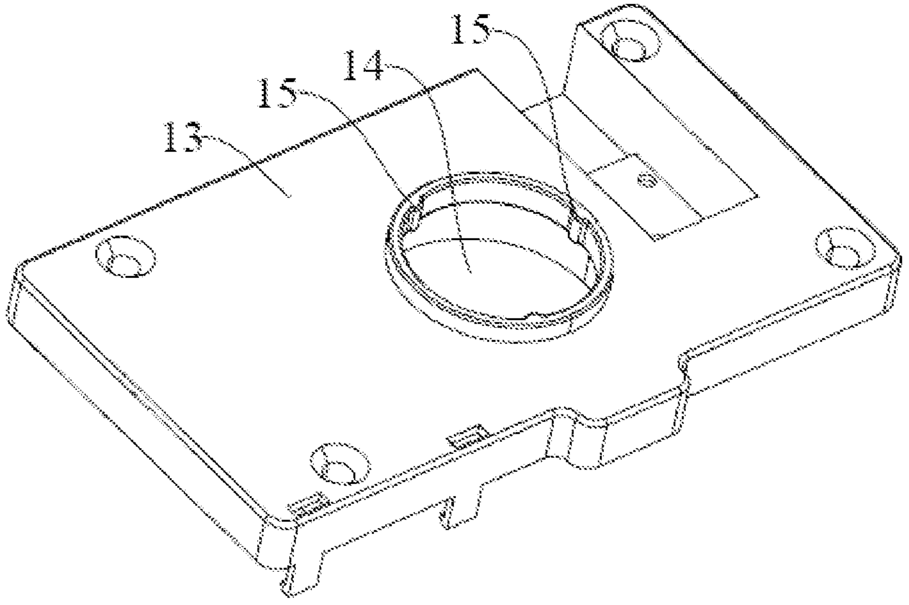
FIG. 6 shows a structural diagram of the limit seat provided in the embodiments of the present invention.
Figure 7:
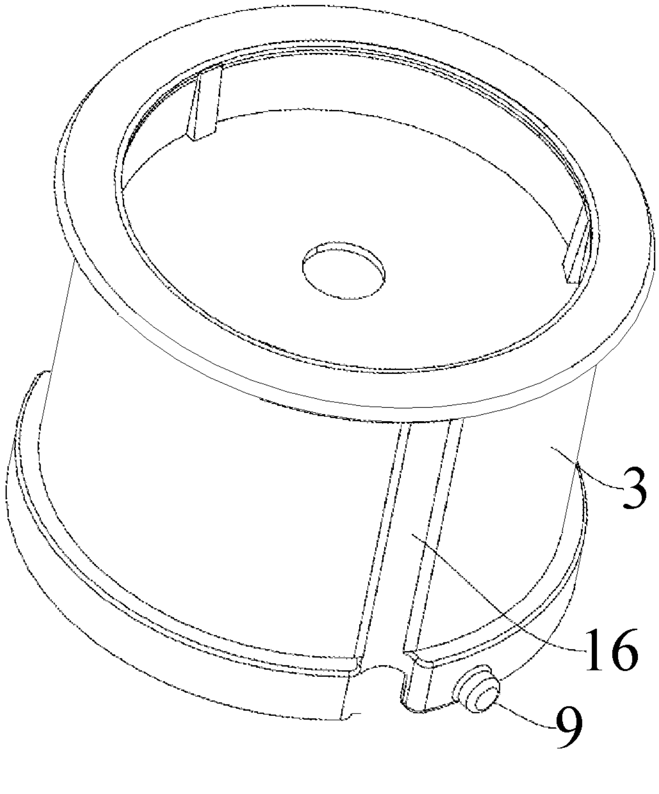
FIG. 7 shows a structural diagram of the bottle holder provided in the embodiments of the present invention.
Figure 8:
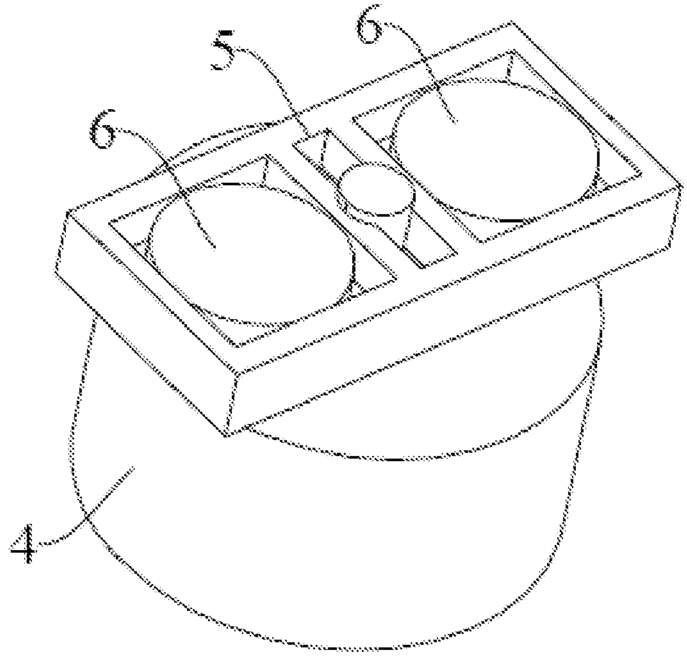
FIG. 8 shows a structural diagram of the first drive motor provided in the embodiments of the present invention.
Figure 9:
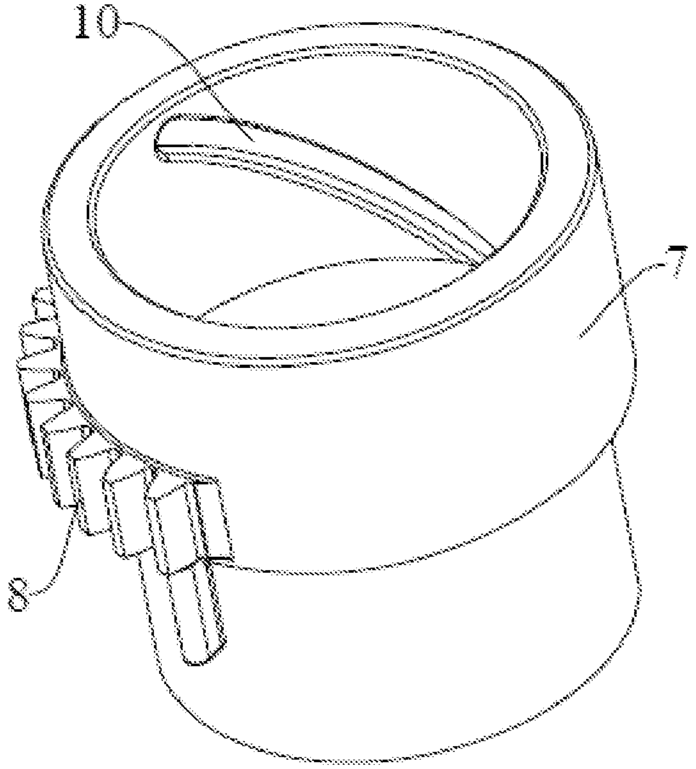
FIG. 9 shows a structural diagram of the driving sleeve provided in the embodiments of the present invention.
Figure 10:
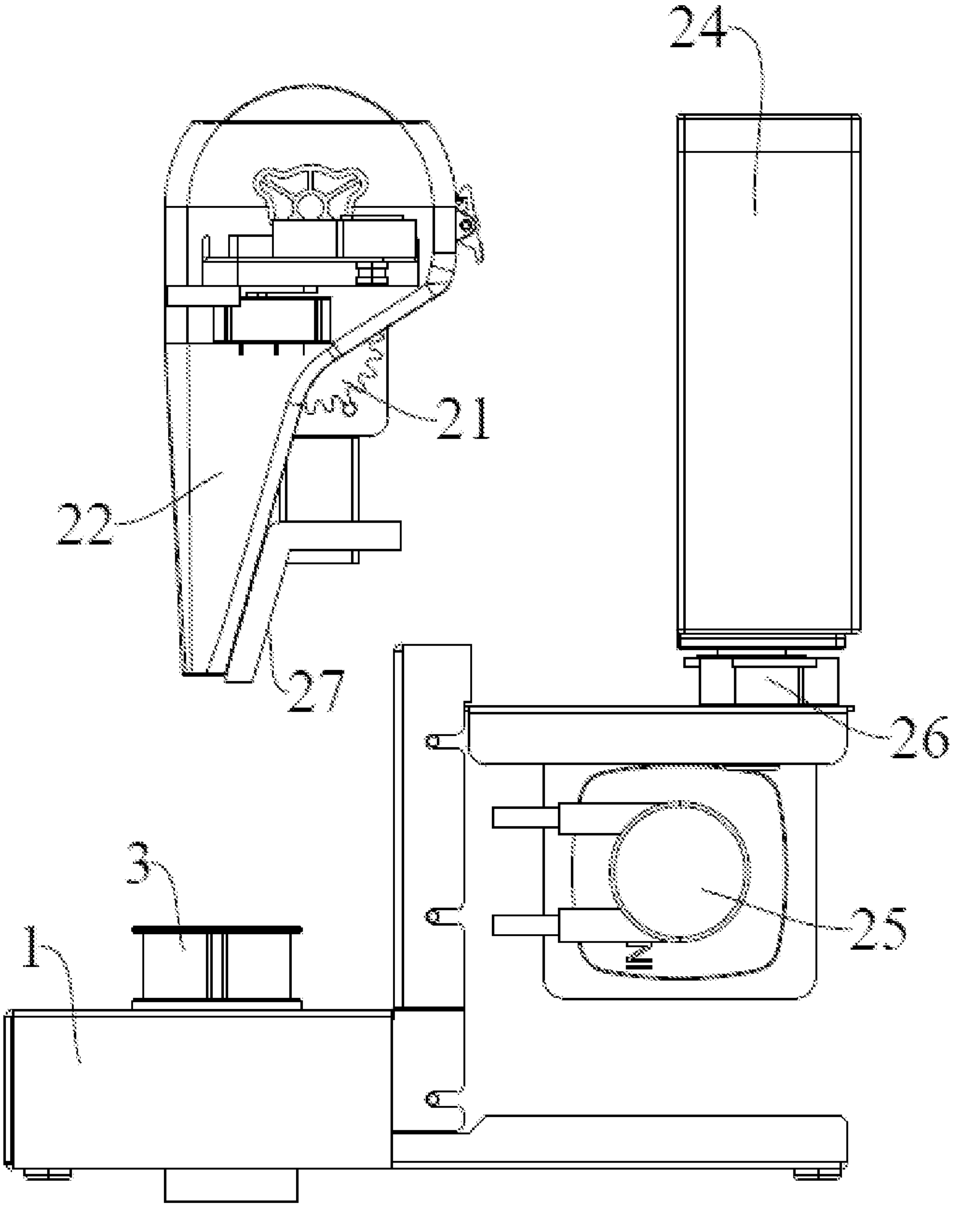
FIG. 10 shows a side view of the internal structure of the automatic compounding machine for food and medicine provided in the embodiments of the present invention.
Figure 11:
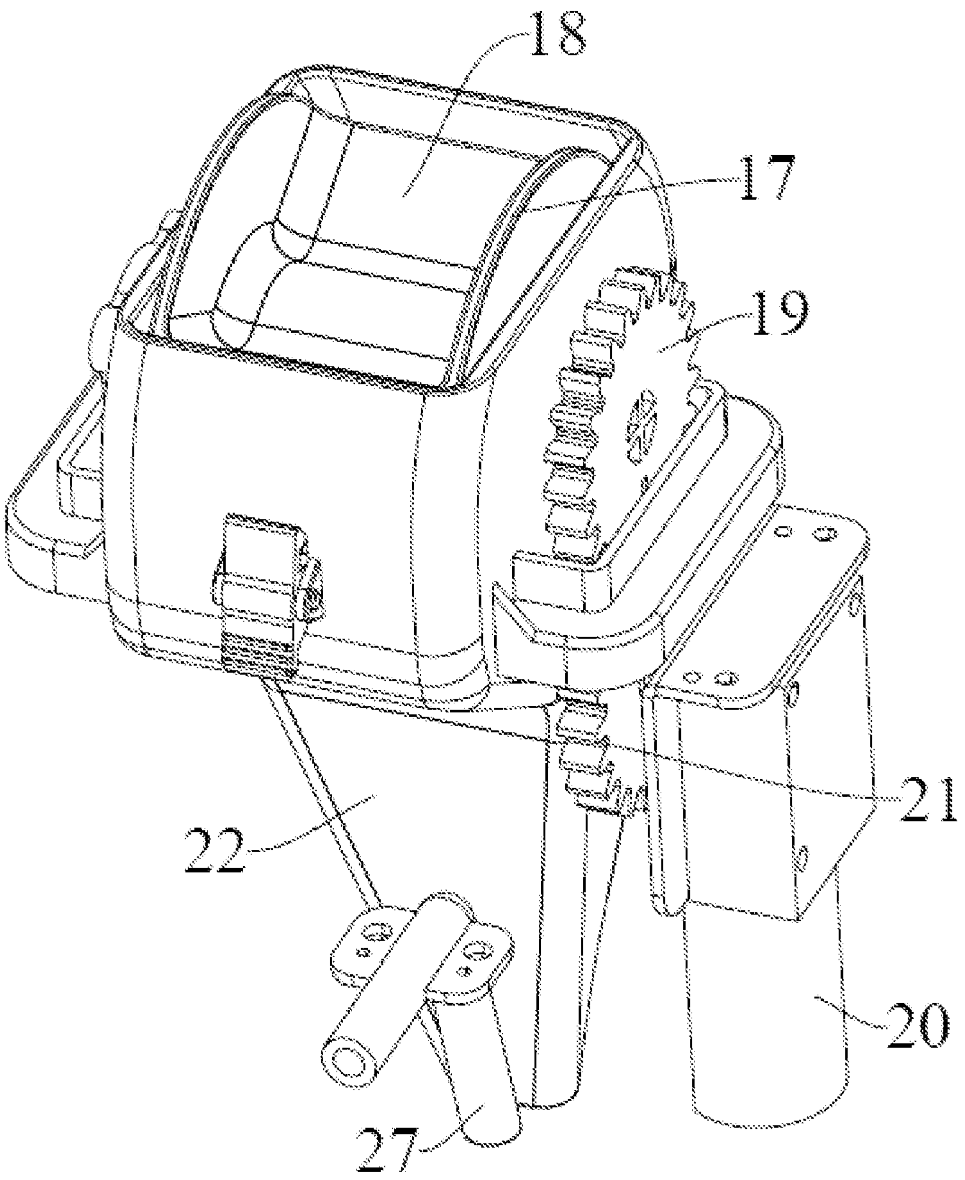
FIG. 11 shows a structural diagram of the stock roll placement provided in the embodiments of the present invention.
Figure 12:
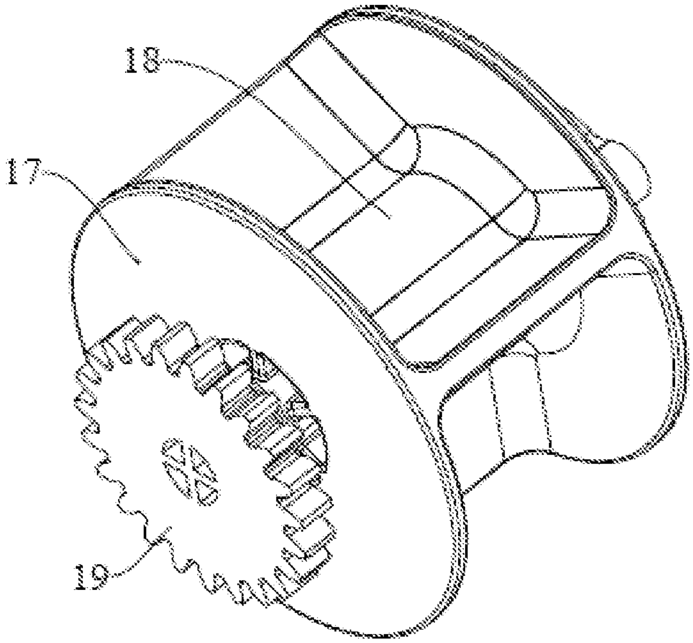
FIG. 12 shows a structural diagram of the stock roll provided in the embodiments of the present invention.
Figure 13:
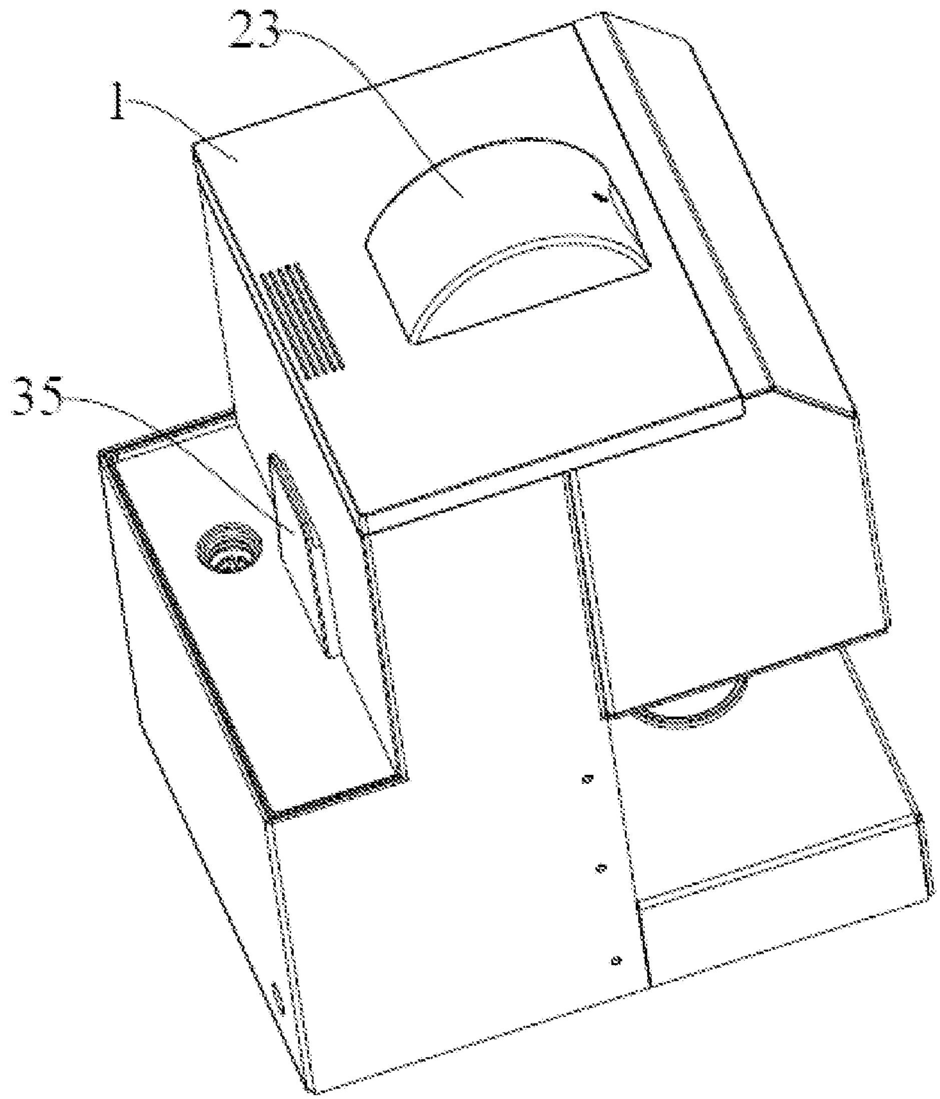
FIG. 13 shows a structural diagram in FIG. 1 with the water tank removed.
Figure 14:
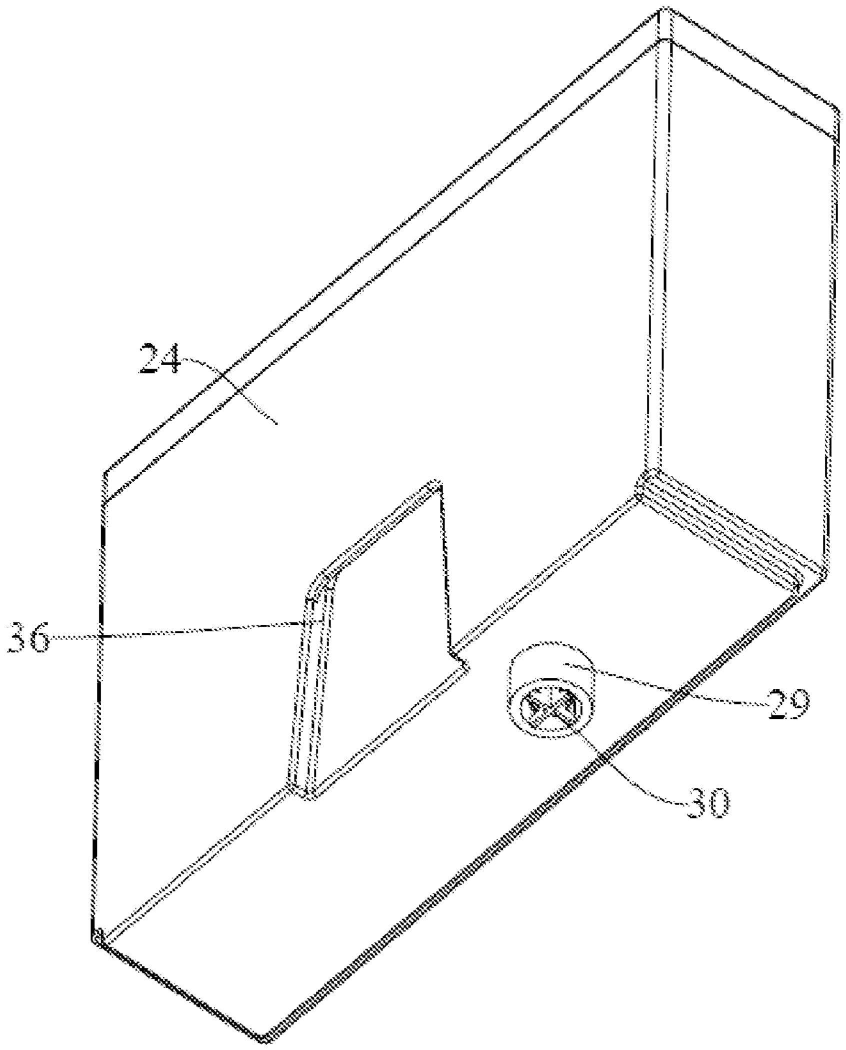
FIG. 14 shows a structural diagram of the water tank provided in the embodiments of the present invention.
Figure 15:
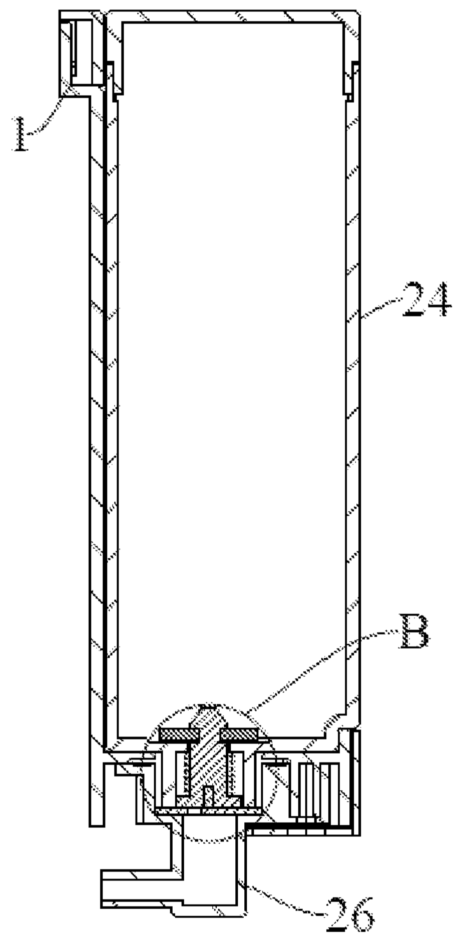
FIG. 15 shows a partial cross-sectional view of the mounting position of the water tank provided in the embodiments of the present invention.

Icons: 1—Hatch; 2—Mixing bottle; 3—Bottle holder; 4—First drive motor; 5—First mounting plate; 6—Magnetic block; 7—Driving sleeve; 8—Rack; 9—Limit slider; 10—Limit chute; 11—Second drive motor; 12—Second gear; 13—Limit seat; 14—Limit hole; 15—Guide block; 16—Guide groove; 17—Stock roll; 18—Stock chest; 19—First gear; 20—Third drive motor; 21—Third gear; 22—Guide funnel; 23—Protecting hood; 24—Water tank; 25—Peristaltic pump; 26—Guide tube; 27—Discharging tube; 28—Outlet hole; 29—Casing; 30—Mounting block; 31—Sealing plate; 32—Bottom plate; 33—Through hole; 34—Spring; 35—Clamping plate; 36—Clamping slot; 37—Control panel; 38—Seal cartridge.

DETAILED DESCRIPTION OF THE PREFERRED EMBODIMENTS

In order to more clearly illustrate the purpose, technical solutions and advantages of the embodiments of the present invention, the technical solutions in the embodiments of the present invention will be described clearly and completely below based on the accompanying drawings in the embodiments of the present invention. Obviously, the embodiments described are only part of the embodiments of the present invention, but not all of them. In general, the components of the embodiments of the present invention described and illustrated in the accompanying drawings herein may be arranged and designed in a variety of different configurations.

Accordingly, the following detailed description of the embodiments of the present invention provided in the accompanying drawings is not intended to limit the scope of the invention to be claimed for protection, but merely to indicate the selected embodiments of the present invention. All other embodiments obtained by those of ordinary skill in the art based on the embodiments of the present invention without creative labor fall within the scope of protection of the present invention.

Embodiment

Referring to FIG. 1-FIG. 17, this embodiment provides an automatic compounding machine for food and medicine, including a hatch 1, the hatch 1 is provided with an automatic powder dropping module for feeding special powder, an automatic water filling module for feeding water, and a bottle holder 3 for supporting a mixing bottle 2; the bottle holder 3 is provided with a first drive motor 4, and the drive shaft of the first drive motor 4 is provided with a first mounting plate 5, the first mounting plate 5 is provided with two magnetic blocks 6 at intervals, and the magnetic blocks 6 can be made of magnets.

The hatch 1 is rotated with a driving sleeve 7, and the outer side wall of the driving sleeve 7 is provided with an arc-shaped rack 8; the bottom of the bottle holder 3 is rotated in the driving sleeve 7, and the outer side wall of the bottle holder 3 is provided with a limit slider 9; the inner side wall of the driving sleeve 7 is tilted upward with a limit chute 10, and the limit slider 9 is provided sliding in the limit chute 10; the hatch 1 is provided with a second drive motor 11, the second drive motor 11 is connected with a second gear 12, and the second gear 12 engages with the rack 8. The second drive motor 11 and the second gear 12 can be connected to each other by means of a gearbox or reduction gearbox.

The hatch 1 is provided with a limit seat 13, the limit seat 13 is provided with a limit hole 14, the limit seat 13 is located in the limit hole 14 with a guide block 15; the bottle holder 3 slides through the limit hole 14, the outer side wall of the bottle holder 3 is provided with a guide groove 16 along its axial direction, the guide block 15 slides in the guide groove 16.

By setting the guide block 15 to slide in the guide groove 16, the bottle holder 3 can only slide up and down along the limit seat 13 but cannot rotate along the limit seat 13 and the hatch 1. By setting the driving sleeve 7, the bottle holder 3 can be raised or lowered along the driving sleeve 7 by the rotation of the driving sleeve 7 to adjust the height of the bottle holder 3.

Adjustment Principle:

When to raise the bottle holder 3, the second drive motor 11 drives the second gear 12 to rotate, and the second gear 12 drives the rack 8 and the driving sleeve 7 to rotate together in the hatch 1 at a certain angle; as the inner wall of the driving sleeve 7 is tilted upward with the limit chute 10, the outer wall of the bottle holder 3 is provided with the limit slider 9, and the limit slider 9 is provided sliding in the limit chute 10; as shown in FIG. 5 to FIG. 9, when the limit chute 10 rotates with the driving sleeve 7, the bottle holder

3 cannot rotate, so the limit slider 9 can move up relative to the tilted limit chute 10, so that the height of the limit slider 9 increases, and at the same time the limit slider 9 drives the bottle holder 3 to slide up along the limit hole 14, thereby raising the height of the bottle holder 3.

Similarly, when to lower the bottle holder 3, the second drive motor 11 drives the second gear 12 to rotate in the opposite direction, and the second gear 12 drives the rack 8 and the driving sleeve 7 to rotate in the hatch 1 in the opposite direction; the limit slider 9 can move down relative to the tilted limit chute 10, so that the height of the limit slider 9 decreases, and at the same time the limit slider 9 drives the bottle holder 3 to slide down along the limit hole 14, thereby lowering the height of the bottle holder 3. In this way, the second drive motor 11 rotates forward and reverse to drive the bottle holder 3 up and down.

The automatic powder dropping module includes a stock roll 17 rotating in the hatch 1, the side wall of the stock roll 17 is provided with a plurality of stock chests 18 along its circumferential direction, three stock chests 18 can be used in this embodiment in fan-shaped distribution, the stock roll 17 is provided with a first gear 19 aligned coaxially; the hatch 1 is provided with a third drive motor 20, the third drive motor 20 is connected with a third gear 21, and the third gear 21 engages with the first gear 19. The third drive motor 20 and the third gear 21 can be connected to each other by means of a gearbox or reduction gearbox.

The hatch 1 is provided with a guide funnel 22, the stock roll 17 is located at the top opening of the guide funnel 22, and the bottom opening of the guide funnel 22 is located above the bottle holder 3. The hatch 1 is rotated with a protecting hood 23 for shielding the stock roll 17.

The automatic water filling module includes a water tank 24, a peristaltic pump 25, a guide tube 26 and a discharging tube 27 arranged in the hatch, the water tank 24 can store pure water, the discharging tube 27 is connected to the outlet end of the peristaltic pump 25 through a pipe, and the outlet port of the discharging tube 27 is located above the bottle holder 3; the guide tube 26 is connected to the inlet end of the peristaltic pump 25 through a pipe, the bottom of the water tank 24 is provided with an outlet hole 28, and the outlet hole 28 is connected to the guide tube 26. The water in the water tank 24 flows through the outlet hole 28 into the guide tube 26 and then to the inlet end of the peristaltic pump 25.

Working Principle:

In actual use, the control panel 37 can be set on the hatch 1 for corresponding operation, and the control panel 37 can be provided with corresponding control switches.

S1: Put the contents such as tablets or capsules in the mixing bottle 2 together with a magnetic stirring bar, and place the mixing bottle 2 on the bottle holder 3. The bottle holder 3 can be provided with a recess on the top so that the bottom of the mixing bottle 2 can be embedded to improve the stability of the mixing bottle 2. After the mixing bottle 2 is well placed, the mixing bottle 2 lies under the opening at the bottom of the guide funnel 22 and the outlet port of the discharging tube 27.

S2: Turn open the protecting hood 23 and pour the special powder in a stock chest 18. After the special powder is mixed with drug and pure water, the mixture can be maintained in a uniformly mixed state to prevent the solid drug powder from settling at the bottom of the liquid. Special powder can be LIQUIDMATE suspending solid beverage powder or YIJIAAN pet snack stabilizer suspending beverage powder available.

S3: Activate the corresponding control switch on the control panel 37 to start the compounding machine.

S4: As the second drive motor 11 drives the bottle holder 3 up to a certain height, the bottle holder 3 drives the mixing bottle 2 up so that the outlet port of the discharging tube 27 is embedded in the top opening of the mixing bottle 2, and then the peristaltic pump 25 starts to inject a quantity of pure water into the mixing bottle 2 through the discharging tube 27.

S5: As the second drive motor 11 drives the bottle holder 3 down to a certain height, the first drive motor 4 starts and drives the first mounting plate 5 and the two magnetic blocks 6 to rotate. Due to the presence of a magnetic stirring bar in the mixing bottle 2, the two magnetic blocks 6 are magnetically attracted to the magnetic stirring bar, and the two magnetic blocks 6 drive the magnetic stirring bar to rotate together when rotating, so that the magnetic stirring bar rotates to stir the contents in the mixing bottle 2. The first drive motor 4 automatically comes to stop and restarts at intervals, so that the magnetic stirring bar automatically stops and restarts until full disintegration of solid food, tablet or capsule contents.

S6: Upon full disintegration of tablet or capsule contents, the first drive motor 4 shuts off, the second drive motor 11 drives the bottle holder 3 up to a certain height, and the bottle holder 3 drives the mixing bottle 2 up so that the bottom opening of the guide funnel 22 is embedded in the top opening of the mixing bottle 2; the third drive motor 20 drives the third gear 21 to rotate, and the third gear 21 drives the first gear 19 and the stock roll 17 to rotate together until the stock chest containing special powder turns downward, then the special powder in the stock chest 18 falls into the guide funnel 22, and enters the mixing bottle 2 through the guide funnel 22.

S7: The second drive motor 11 drives the bottle holder 3 down to a certain height, and the first drive motor 4 starts to rotate the magnetic stirring bar, so that the contents in the mixing bottle 2 are fully stirred and mixed.

S8: Stop the compounding machine at the end of stirring and mixing.

In this way, the automatic compounding machine for food and medicine provided in the present application is used for mixing and stirring the contents of solid food, tablets or capsules with special powders and pure water into a liquid suspension, thus facilitating the taking of solid food or drugs, and the accurate dosing division of drugs, saving time and effort with high preparation efficiency.

As shown in FIG. 13-FIG. 17, in some embodiments of the present invention, the water tank 24 is removably connected to the hatch 1, the bottom of the water tank 24 is provided with a casing 29 along the outlet hole 28, the inner diameter of the casing 29 is larger than the diameter of the outlet hole 28; the casing 29 is provided with a mounting block 30 sliding inside, the diameter of the mounting block 30 is smaller than the inner diameter of the casing 29, the mounting block 30 is provided with a sealing plate for sealing the outlet hole 28, the sealing plate 31 can be made of rubber, the diameter of the sealing plate 31 is larger than that of the outlet hole 28, and the sealing plate 31 is located in the water tank 24;

The bottom of the mounting block 30 is located outside of the casing 29, the casing 29 is provided with a spring 34, the spring 34 sheaths outside the mounting block 30, one end of the spring 34 is connected to the water tank 24, the other end of the spring 34 is connected to the bottom of the mounting block 30; the guide tube 26 is provided with a bottom plate 32, the bottom plate 32 can be made of plastic, the bottom plate 32 is provided with a plurality of through holes 33, and the bottom of the mounting block 30 is connected to the bottom plate 32. The hatch 1 is provided with a clamping plate 35, and the side wall of the water tank 24 is provided with a clamping slot 36 that fits with the clamping plate 35. Optionally, the guide tube 26 can be provided with a seal cartridge 38 inside, the seal cartridge 38 is made of rubber, and when the casing 29 is inserted into the guide tube 26, the seal cartridge 38 sheaths outside the casing 29 for sealing purpose to prevent water from flowing out.

In the present invention, the water tank 24 is removably connected to the hatch 1, making it easy to remove the water tank 24 to feed pure water. When to mount the water tank 24, the water tank 24 is inserted into the hatch 1 from top to bottom, and the clamping plate 35 of the hatch 1 snaps into the clamping slot 36 on the side wall of the water tank 24 for fixing, so that the water tank 24 is installed in the hatch 1, while the outlet hole 28 at the bottom of the water tank 24 is aligned with the guide tube 26.

Figure 16:
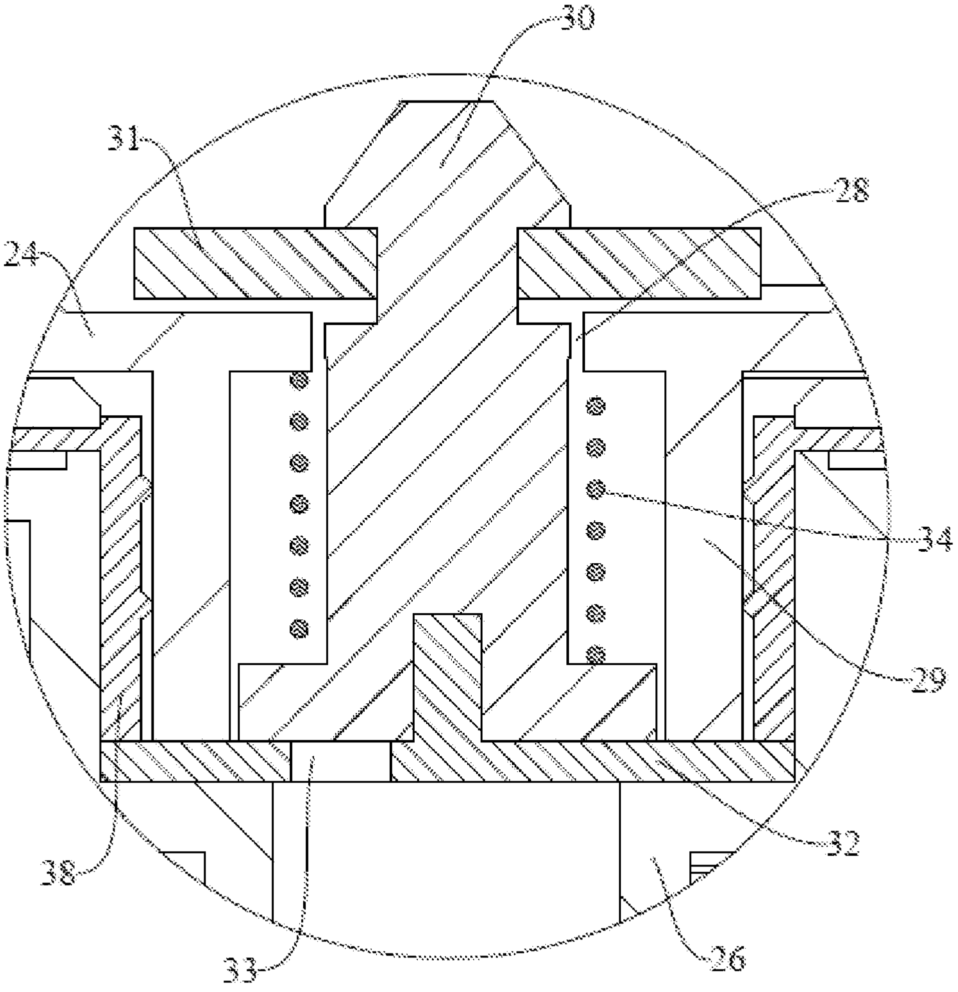
FIG. 16 shows an enlarged view of part B in FIG. 15.
Figure 17:
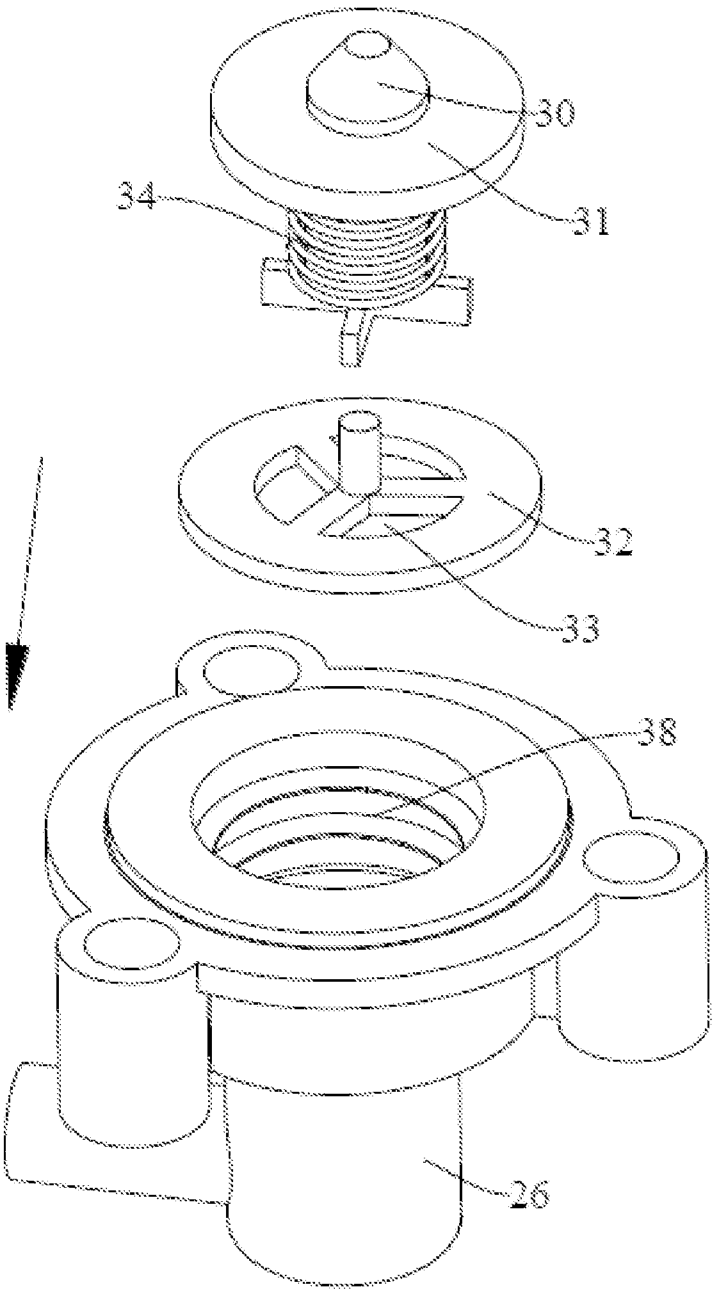
FIG. 17 shows an explosive view of the structure of the guide tube and the sealing plate, etc., provided in the embodiments of the present invention.

When the water tank 24 is installed, the casing 29 at the bottom of the water tank 24 is inserted into the guide tube 26, the bottom of the mounting block 30 is connected to the bottom plate 32, while the mounting block 30 is topped by the bottom plate 32, the mounting block 30 and the sealing plate 31 move up together relative to the water tank 24, while the spring 34 is compressed to increase the elastic potential energy, as shown in FIG. 16, so that the sealing plate 31 stays far away from the outlet hole 28 of the water tank 24 and remains a certain gap from the outlet hole 28; at this time, the pure water in the water tank 24 can flow through the outlet hole 28 and the casing 29 into the guide tube 26 to complete the water delivery.

When the water tank 24 is pulled out of the hatch 1, the casing 29 at the bottom of the water tank 24 is separated from the guide tube 26, then under the action of the spring 34, the spring 34 pushes the mounting block 30 downward, the mounting block 30 drives the sealing plate 31 down relative to the water tank 24, at this time the sealing plate 31 can touch the inside wall of the tank 24 tightly so that the sealing plate 31 seal the outlet hole 28 of the tank 24, to prevent the pure water in the water tank 24 flowing out through the outlet hole 28.

The above are preferred embodiments of the present invention only and are not intended to limit the present invention. It is apparent to those skilled in the art that the present application is not limited to the details of the exemplary embodiments above, and that it is possible to realize this application in other specific forms without departing from the spirit or essential features of the present application.

Therefore, the embodiments should be viewed as exemplary and non-limiting for every point. The scope of the present application is defined only by the appended claims rather than the descriptions above, and it is therefore intended to encompass all variations that fall within the meaning and scope of the equivalent elements of the claims in the present application. Any appended markings in the claims should not be considered a limitation of the claims involved. The present invention is subject to changes and variations for those skilled in the art. Any modification, equivalent replacement, improvement or other changes made within the spirit and principles of the present invention should be included in the scope of protection of the present invention.

The invention claimed is:

1. An automatic compounding machine for food and medicine, comprising a housing, wherein the housing is provided with an automatic powder dropping module for feeding special powder, an automatic water filling module for feeding water, a bottle holder for supporting a mixing bottle, wherein the bottle holder is provided with a first drive motor, and a drive shaft of the first drive motor is provided with a first mounting plate, and the first mounting plate is provided with two magnetic blocks at intervals, a driving sleeve, wherein an outer side wall of the driving sleeve is provided with an arc-shaped rack, wherein a bottom of the bottle holder is rotated in the driving sleeve and an outer side wall of the bottle holder is provided with a limit slider, wherein an inner side wall of the driving sleeve is tilted upward with a limit chute and the limit slider is capable of sliding in the limit chute, and a second drive motor, wherein the second drive motor is connected with a second gear and the second gear engages with the rack.

2. The automatic compounding machine for food and medicine as set forth in claim 1 wherein the housing is provided with a limit seat, the limit seat is provided with a limit hole, the limit seat is located in the limit hole with a guide block; wherein the bottle holder slides through the limit hole, the outer side wall of the bottle holder is provided with a guide groove along an its axial direction of the bottle holder, and the guide block is provided sliding in the guide groove.

3. The automatic compounding machine for food and medicine as set forth in claim 1, wherein the automatic powder dropping module includes a stock roll rotating in the housing, the side wall of the stock roll is provided with a plurality of stock chests along a circumferential direction of the stock roll, the stock roll is provided with a first gear aligned coaxially; wherein the housing is provided with a third drive motor, the third drive motor is connected with a third gear, and the third gear engages with the first gear.

4. The automatic compounding machine for food and medicine as set forth in claim 3, wherein the housing is provided with a guide funnel, the stock roll is located at the top opening of the guide funnel, and the bottom opening of the guide funnel is located above the bottle holder.

5. The automatic compounding machine for food and medicine as set forth in claim 3, wherein the housing is provided with a protecting hood for shielding the stock roll.

6. The automatic compounding machine for food and medicine as set forth in claim 1, wherein the automatic water filling module includes a water tank, a peristaltic pump, a guide tube and a discharging tube arranged in the housing, wherein the discharging tube is connected to the outlet end of the peristaltic pump through a pipe, and the outlet port of the discharging tube is located above the bottle holder; wherein the guide tube is connected to the inlet end of the peristaltic pump through a pipe, the bottom of the water tank is provided with an outlet hole, and the outlet hole is connected to the guide tube.

7. The automatic compounding machine for food and medicine as set forth in claim 6, wherein the water tank is removably connected to the housing, the bottom of the water tank is provided with a casing along the outlet hole, and the inner diameter of the casing is larger than the diameter of the outlet hole; wherein a mounting block is provided sliding in the casing, the diameter of the mounting block is smaller than the inner diameter of the casing, the mounting block is provided with a sealing plate for sealing the outlet hole, the diameter of the sealing plate is larger than that of the outlet hole, and the sealing plate is located in the water tank;

wherein the bottom of the mounting block is located outside the casing, the casing is provided with a spring inside, the spring sheaths outside the mounting block with one end connected to the water tank and the other end to the bottom of the mounting block; wherein the guide tube is provided with a bottom plate, the bottom plate is provided with a plurality of through holes, and the bottom of the mounting block touches the bottom plate.

8. The automatic compounding machine for food and medicine as set forth in claim 7, wherein the housing is provided with a clamping plate, and the side wall of the water tank is provided with a clamping slot that fits with the clamping plate.

9. An automatic compounding machine for food and medicine, comprising a housing, wherein the housing is provided with an automatic powder dropping module for feeding special powder, an automatic water filling module for feeding water, and a bottle holder for supporting a mixing bottle, wherein the bottle holder is provided with a first drive motor, and a drive shaft of the first drive motor is provided with a first mounting plate, and the first mounting plate is provided with two magnetic blocks at intervals, wherein the automatic water filling module includes a water tank, a peristaltic pump, a guide tube and a discharging tube arranged in the housing, wherein the discharging tube is connected to the outlet end of the peristaltic pump through a pipe, and the outlet port of the discharging tube is located above the bottle holder; wherein the guide tube is connected to the inlet end of the peristaltic pump through a pipe, the bottom of the water tank is provided with an outlet hole, and the outlet hole is connected to the guide tube, wherein the water tank is removably connected to the housing, the bottom of the water tank is provided with a casing along the outlet hole, and the inner diameter of the casing is larger than the diameter of the outlet hole; wherein a mounting block is provided sliding in the casing, the diameter of the mounting block is smaller than the inner diameter of the casing, the mounting block is provided with a sealing plate for sealing the outlet hole, the diameter of the sealing plate is larger than that of the outlet hole, and the sealing plate is located in the water tank;

wherein the bottom of the mounting block is located outside the casing, the casing is provided with a spring inside, the spring sheaths outside the mounting block with one end connected to the water tank and the other end to the bottom of the mounting block; wherein the guide tube is provided with a bottom plate, the bottom plate is provided with a plurality of through holes, and the bottom of the mounting block touches the bottom plate.

10. The automatic compounding machine for food and medicine as set forth in claim 9, wherein the housing is provided with a clamping plate, and the side wall of the water tank is provided with a clamping slot that fits with the clamping plate.

* * * * *